US009898894B2

(12) United States Patent
Chhabra et al.

(10) Patent No.: US 9,898,894 B2
(45) Date of Patent: Feb. 20, 2018

(54) METHOD OF MANAGING A LOTTERY

(71) Applicant: Pollard Banknote Limited, Winnipeg (CA)

(72) Inventors: Amit Chhabra, Winnipeg (CA); Darren Martin Wareham, Winnipeg (CA); James Michael Sankey, Winnipeg (CA)

(73) Assignee: Pollard Banknote Limited, Winnipeg, MB (CA)

( * ) Notice: Subject to any disclaimer, the term of this patent is extended or adjusted under 35 U.S.C. 154(b) by 55 days.

(21) Appl. No.: 14/808,416

(22) Filed: Jul. 24, 2015

(65) Prior Publication Data

US 2017/0024954 A1 Jan. 26, 2017

(51) Int. Cl.
*G06F 17/00* (2006.01)
*G07F 17/32* (2006.01)

(52) U.S. Cl.
CPC ........ *G07F 17/329* (2013.01); *G07F 17/3227* (2013.01); *G07F 17/3251* (2013.01); *G07F 17/3262* (2013.01)

(58) Field of Classification Search
USPC .................................................... 463/16–25
See application file for complete search history.

(56) References Cited

U.S. PATENT DOCUMENTS 5,871,398 A * 2/1999 Schneier ............... G07F 17/329 463/16
6,402,614 B1 * 6/2002 Schneier ................ A63F 3/081 463/17
7,008,317 B2 3/2006 Cote
2010/0173691 A1 * 7/2010 Wolfe ..................... G07F 17/32 463/17
2016/0189467 A1 * 6/2016 Onorato ................ G07F 17/329 463/17

* cited by examiner

*Primary Examiner* — Ronald Laneau
(74) *Attorney, Agent, or Firm* — Adrian D. Battison; Ade & Company Inc.; Ryan W. Dupuis

(57) ABSTRACT

A method is provided of managing awards to players in a lottery where players purchase lottery access tickets, each of which is assigned a predetermined prize in the lottery and each of which provides access to a selected one of a series of accessible video games on a computer medium. Each game has a plurality of game images in which the player can enter a selected action from a number of options based on different skill levels where the selected action can have a token value different from other options. The system displays a table to the player of an accumulation of the tokens and controls the accumulation of the tokens in order that the final prize matches the predetermined prize but may allow other awards to more skilled players. The prize must be validated using a code from the ticket and from an image in the displayed game.

19 Claims, 3 Drawing Sheets

METHOD OF MANAGING A LOTTERY

This invention relates to a method of managing a lottery where each individual game of the lottery can be played by customer of the lottery which allows the customer to freely select from options available in the game, while still ensuring that a prize arising as an outcome of the game is wholly predetermined allowing the lottery to properly predict the total payout from all of the games.

BACKGROUND OF THE INVENTION

In the 80's as instant win lotteries were being introduced, game play was initially based on simple play formats including Match 3 of 6 and other styles of previously known games such as Tic Tac Toe, etc. The outcome of play on all games was pre-determined. As the industry evolved lottery organizations and ticket manufacturers wanted to provide greater playability to their customers. Developments included extended play games, Bingo, Crossword, etc. which took several minutes to play. Other products featured multiple play areas with the chance to win multiple prizes on the same ticket or groupings of tickets within a single game piece, for example the Pollard Play Book. In each case the outcome was predetermined and there was only one way to play, with no opportunity to replay the game or apply any level of skill or experience.

There was also development efforts made to develop probability based games where players would make selections from available options as to how the ticket would be played. Depending on the selections made by the player the outcome would vary. These styles of tickets however had two major drawbacks, firstly the final outcome for the lottery could not be pre-determined and secondly because each ticket is a potential winner, the security requirements were higher. Some lotteries did offer these products for sale but this was very limited and this product was not maintained.

With the evolution of computer-based and web-based gaming cross-over products have been developed which begin with an instant win ticket and/or an entry code which is used to access electronic gaming.

As described following one product which has been offered is by Ingenio, the operation of which is shown in U.S. Pat. No. 7,008,317 (Cote) issued Mar. 7, 2006. The Ingenio system, while offering a game play on a computer still has a single play format and pre-determined outcome. According to this patent, for a particular play experience on the instant lottery ticket, there is pre-determined digital play/outcome associated with it. No matter how many times a player replays the digital game associated with the same code, the game face and hence the player experience is the same. That is there are no options in the game which are presented by the game to the player and can be freely selected by the player, since during game play the game played is merely entertainment and all selections within the game are made by the computer system Others suppliers tried to overcome this problem by providing access to a computer game but simply in the form of a second chance draw which offers no play experience and the overall outcome for the lottery is pre-determined, although not at the player level.

It has remained a problem therefore in this industry to pre-determine the outcome of a skill-based game. A solution needs to be developed that rewards players who are more skilled at the game than the novice players while maintaining the requirement that the result of each game is predetermined so that the total result when all the games are played is predetermined thus setting the total lottery prize liability at a set sum.

SUMMARY OF THE INVENTION

According to one aspect of the invention there is provided a method of managing a lottery comprising:

providing a set of lottery access components, each of which is arranged to be purchased by a customer requiring entry into the lottery;

assigning each of the lottery access components a predetermined win status having a prize value which is selected from a plurality of potential prizes including zero prize;

the set therefore having a predetermined total prize value;

using a computer based system to generate on a medium visible to the customers a series of accessible games;

each game having display images which are visible to the customer when accessed by the customer using the lottery access component;

each game having a plurality of game steps in which an image is displayed to the customer and in which the customer is required to enter a selected action responsive to the image displayed;

wherein the game, which is accessed by a purchased one of the lottery access components, is completed by the customer entering the selected action for all of the game steps;

at least some of the game steps having an associated step prize which is allocated to the player for selecting an associated action;

at least one of the game steps having a plurality of options from which the customer can select the action, where the customer has allocated different step prizes for selecting different options;

providing an accumulation of the step prizes to generate a total prize for the game after all of the game steps are completed;

and controlling by the computer based system, in the accessed game, the accumulation of the step prizes of the accessed game in order that the total prize matches the prize value;

and validating a payment to the customer of the prize value.

According to more general definition of the invention there is provided a method of playing a game having a predetermined prize value comprising:

using a computer based system to generate a game having display images on a medium visible to a customer;

the game having a plurality of game steps in which an image is displayed to the customer and in which the customer is required to enter a selected action responsive to the image displayed;

wherein the game is completed by the customer entering the selected action for all of the game steps;

at least some of the game steps having an associated step prize which is allocated to the player for selecting an associated action;

at least one of the game steps having a plurality of options from which the customer can select the action, wherein the customer has allocated different step prizes for selecting different options;

providing an accumulation of the step prizes to generate a total prize for the game after all of the game steps are completed;

and controlling by the computer based system the accumulation of the step prizes of the accessed game in order that the total prize matches said predetermined prize value.

The lottery access components can take many forms but typically comprise a purchased ticket which carries a code unique to the purchased lottery access component which allows access by the customer into an accessed one of the series of games. In other cases the code may be carried on other media including electronic communications. One advantage of the printed ticket is that this can then be managed using conventional lottery procedures where the ticket also is part of a later validation process. Thus in the arrangement described hereinafter, the access components comprise entry codes which can be provided on a ticket or on other media. These allow a player to access the game and win prizes.

The computer system used to control the different aspects of the game is not necessarily a single computer system under the control of one managing entity but may be formed as separate elements partly controlled by the lottery company and partly by a game management system. The lottery may manage the sale of the access components and the validation of prizes while the remainder of the system may be generated and managed by a game management system. Other arrangements of control and other combinations of computer systems can be used.

Typically the game images are communicated through an internet or mobile phone transmission system where the player accesses the games using an app obtained onto their mobile or other terminal device from an app supplier where the app controls the game image access and communications. However, the whole system can be applied to other communications systems including a dedicated system including access terminals for the players.

In accordance with one important optional feature, in the case that the customer has selected an option which has allocated a step prize for selecting different options which is greater than another step prize, a secondary advantage is awarded to that customer which is different from the predetermined prize. In the arrangement described in more detail herein, the game steps are the individual moves in the game undertaken by the players. In the arrangement hereinafter, the image is the game screen and the options are the different choices available in the same game screen. The step prizes are the individual prizes awarded at each move of the player and are accumulated in a prize meters/gauge. That is by step prize the following arrangement provides the allocation, by the computer, of incremental awards such that the play meter moves one step closer to a prize value. In other words, the computer is responsible for the assignment of the reward resulting from the player selections. These may be single or multiple blocks, token or units depending on how the step was played.

That is the options presented to the player or customer are arranged to be selected by the player based on a skill level of the player so that a player of more skill playing the same game can get more step prizes or step prizes of greater value. Thus the player has at least the perception that the greater level of skill applied has led to an advantage. However in respect of the final total prize awarded the step prizes are managed by the computer control system so that they are accumulated in a manner which leads only to the same total prize. However other prizes apart from the monetary final or total prize can be awarded to the player. This can take the form of recognition in a score table amongst other players, longer playing time, an experience of more closely approaching a higher prize or any other non-prize associated awards such as points in a loyalty program. Even though the actual prize is predetermined, the player does not of course know what that prize is until the final reveal so that a higher level of skill in the selections can be used to bring the player closer to various prize of higher or lower level until that actual reveal is made at the last step in the game.

Preferably the control system is arranged for displaying to the customer the accumulation as it occurs during the game. Preferably this is done on the same screen as the game images but it can be a separate screen accessed by the player during the game or after each step.

The algorithm by which the control system controls and displays to the player the different step prizes obtained by the player as a result of the free selection of various options in the game steps while accumulating them to a final predetermined result can have many possibilities.

One example is to provide different components to the step prize and to accumulate them independently. In this way the computer system can manage the accumulations so that the totals only reach a predetermined result.

Another example is to cause the computer system to vary the award of the value of step prizes so that the accumulations reach only a predetermined result. That is the players receive a step prize of higher value for selecting options using greater skill, but the difference in the amount of an increase in value can be controlled by the computer system so that the total accumulation is controlled.

In this way the control system allows the player to freely select options in the game and to provide different values for those options but then manages the allocation and/or the amount of the values so that the values are accumulated in the to a display shown to the player, so that the player is apparently accumulating prizes based on player skill, but the total of the accumulation is managed to the predetermined required result.

In the preferred arrangement described in more detail herein, the prize values comprise a plurality of tokens where one or more tokens are granted for at least some of the actions and the accumulation comprises a series of separate virtual pots or containers where the tokens are accumulated.

More preferably, the prize values each can comprise a plurality of tokens where one option to be selected has a first number of tokens (typically one token) and a second option to be selected has a different number of tokens (such as two tokens or in some cases even more tokens). The accumulation then comprises a series of virtual pots or containers where the tokens are accumulated and each virtual pot is associated with a respective one of a plurality of potential prizes of the game. The prize is awarded if the accumulated tokens fill a respective virtual pot associated with that prize. The control system controls the allocation of the accumulated tokens to selected ones of the series of virtual pots in a manner invisible and indiscernible to the player so that the predetermined result is obtained.

Preferably each virtual pot is shown to the player as a line or row of tokens accumulated to show to the player how close they are to the associated potential prizes and the prize is awarded if the accumulated tokens fill a respective line or row associated with that prize. This therefore appears as a score table where the tokens or step prizes are accumulated as a row associated with specific lottery prize. However other display arrangements can be used for the virtual pots where the tokens are not arranged in a row. In the most preferred arrangement the score table forms vertical columns but as an alternative, loading bars where the prize meters are laid horizontally can be used or as a further alternative a circular array can be provided where the tokens are added in circle of a predetermined angle around the center which can be called “Step loading Buttons”. Typically only a single prize is awarded on the game so that the accumulation is managed so that only one of the pots is filled, but it is possible also to form composite total prizes by filling more than one pot on the game accumulator.

As another alternative the prizes may be in values different from a single or multiple token, such as a dollar amount, and the display may show the number of total dollars accumulated leading toward the total. This could be in percentage values aiming toward a 100% total.

Thus in one case, one option to be selected has a first number of tokens and a second option to be selected has a different number of tokens.

Therefore for example, the computer system running the game may have a sub-procedure recording the step prizes obtained by customers so that customers can compare results.

Therefore for example, the computer system running the game may have a sub-procedure recording the time taken by a customer to play the game for purposes of comparisons with other games.

Preferably the control system manages the game images displayed so that the game can be played repeatedly for each game access component and is different every time the game is replayed for the same component. Mathematically it is possible that someone gets the exact same starting state but the chances of that happening are very low.

Preferably the control system manages the game images displayed such that the images of the steps displayed are arranged such that each is dependent on the action selected for the previous step.

The arrangement shown and described here may provide one or more of the following features and advantages.

The game can provide the player an opportunity to play a game repeatedly, using a single code, and for which the game experience can change each time, although the final outcome would still be pre-determined.

Initially the player purchases an access component or entry code, either associated with an instant win lottery ticket or a standalone gaming coupon or from the lottery electronically.

The lottery game can be played in a variety of electronic formats including web-based, computer-based or as an app on a mobile device. Other forms of electronic play could also be used.

In addition the same play format can be applied to non-lottery consumer products. In each case the final outcome associated with each code would be pre-determined. In every case, play is based on an algorithm which provides the opportunity for repeated plays and which changes the play format based on player selections and skill level while maintaining the same final outcome.

The algorithm developed to reward players skill-based game rewards the player based on the level of skill. In other words, the players who are experts in the game will have a different experience in the game compared to novice players even if the use the same access component or entry code from the same ticket. Thus there are provided the following key points in the digital game play:

-a- The image displayed or game face or the starting state of the digital game, associated with the entry code printed on instant lottery ticket, may be completely random and may be different every time the game is replayed for the same code.

-b- The play experience will vary from player to player, based on their skill, as there could be multiple play options available for each game step to the player even if the same entry code is used.

-c- The successive options at each game step are dependent on selected option in the previous game step.

-d- The final outcome of the game will be the same irrespective of the skill of the players. The player can basically take a different path to get to the final outcome every time they play or re-play the game. In essence, there are many-to-one relationship between the digital game play and the outcome.

-e- A more skilled player will be rewarded for their skill even though the final outcome remains the same. For example, a more skilled player may see more near wins, that is a situation where a player gets very close to winning a prize but doesn’t really win it, compared to the player with relatively lower skill level. Alternatively, a more skilled player may be rewarded with:

a longer play experience, additional games, possibly with additional chances to win, and/or other enhanced game features, or any other non-prize associated awards such as points in a loyalty program.

Based on the moves that a players makes within the game, they can earn points or tokens so that better, more skilled moves, that is selecting the more skilled option, would earn more points. This would allow the system to maintain a leaderboard of scores that could be used in many different ways. They lottery could choose to reward players on the top of the leaderboard and for players, it would be bragging rights.

The game can also include a time component. This will record the amount of time a player took to complete the game. This allows the system to maintain a time leaderboard and could also contribute towards score. For example, if a player finishes the game in less time than others, they would get more end of game score points.

In one enhancement, the computer system can maintain a dynamic meter that will get filled up based on the options the player will choose at each game step. This meter will have three levels and as the meter reaches each milestone, the player would be awarded a Star. The player could earn up to 3 stars on Star Level Meter.

In essence, the score, time and star levels are related. They all can be used to maintain leaderboards and make the game more competitive by providing bragging rights. This can be a meter that will get filled up based on the moves that the players make. Reaching a certain score within certain time would grant the player a star.

The system can maintain leaderboards with the above information (score, time and star levels). And with the integration of Social Media, the system can maintain social leaderboards as well. Another feature of in-game economy can be provided where coins could be awarded based on the options that the player selects and how quickly they select the option. These coins would all the players to buy items from the game store to personalize the experience.

The game can be applied to many game formats where a series of sequential screens are displayed to the player and the player selects an action from available options on the screen. In many games the selection is based on a skill factor obtained by analysis of the information on the screen or by improved hand/eye coordination. In both cases one player will select better options than another player and the present system allows the players to use that skill to obtain advantage or greater benefits while the final prize is wholly predetermined.

One example of games of this type are Candy crush but there are many games of this general type.

In one example of the Candy Crush game, the system is arranged to provide only one kind of special symbol irrespective of the number of symbols matched by the player. In other words, the special symbol is the same and has the same effect if you match 4, or 5, or 6 symbols. The system can extend the game by providing multiple special symbols based on the matches. In addition to this, the system can allow special symbols to be combined with other special symbols to produce a combination effect/reward for the players.

The game can be provided as a simple square 8×8 grid but the system can be modified to easily add more complexity by changing the shape and size of the grid.

In accordance with a second aspect of the invention there is provided a method of managing a lottery comprising:

providing a set of lottery access components each of which is arranged to be purchased by a customer requiring entry into the lottery;

assigning each of the lottery access components a predetermined win status having a prize value which is selected from a plurality of potential prizes including zero prize;

using a computer based system to generate on a medium visible to the customers a series of accessible games;

each game having display images which are visible to the customer when accessed by the customer;

wherein the game, which is accessed by a purchased one of the lottery access components, is completed by the customer entering one or more selected actions based on the display images;

and validating a payment to the customer of the prize value by entering into a validation terminal of the computer based system a code from the lottery access component and a code supplied as one of the display images of the game.

That is, in one example described in more detail hereinafter, to validate the game and claim the prize, the player needs two pieces of information. There is a validation number provided on the access component, for example printed on the instant ticket, and a confirmation code or PIN that is awarded or displayed to the player through the mobile app after they complete the game on their Mobile Device. To claim the prize, the player needs to present both the instant ticket and for example a 4-digit PIN from the mobile game. If one of these two pieces is missing, the player will not be able to claim the prize. In an event, if a player loses the instant ticket and someone else finds the ticket, they will be able to play the game to claim the prize. However the game must be played to obtain the second code, thus requiring the layer to enter the one line or computer displayed game and to complete that game to obtain the second code. If the game is played on a computer or other non-portable device, there can be an option for printing out a coupon with the validation PIN to be used for validation purposes.

The term code as used herein is not intended to be limited to numeric or alphanumeric data and the code can include other symbols or combinations of symbols which can be entered by the player in a computer environment.

BRIEF DESCRIPTION OF THE DRAWINGS

One embodiment of the invention will now be described in conjunction with the accompanying drawings in which:

FIG. 3A shows one extreme situation where the player is unskilled and receives only a single token for each step. FIG. 3B shows an opposed extreme situation where the player is very skilled and receives two tokens for each step.

DETAILED DESCRIPTION

Figure 1:
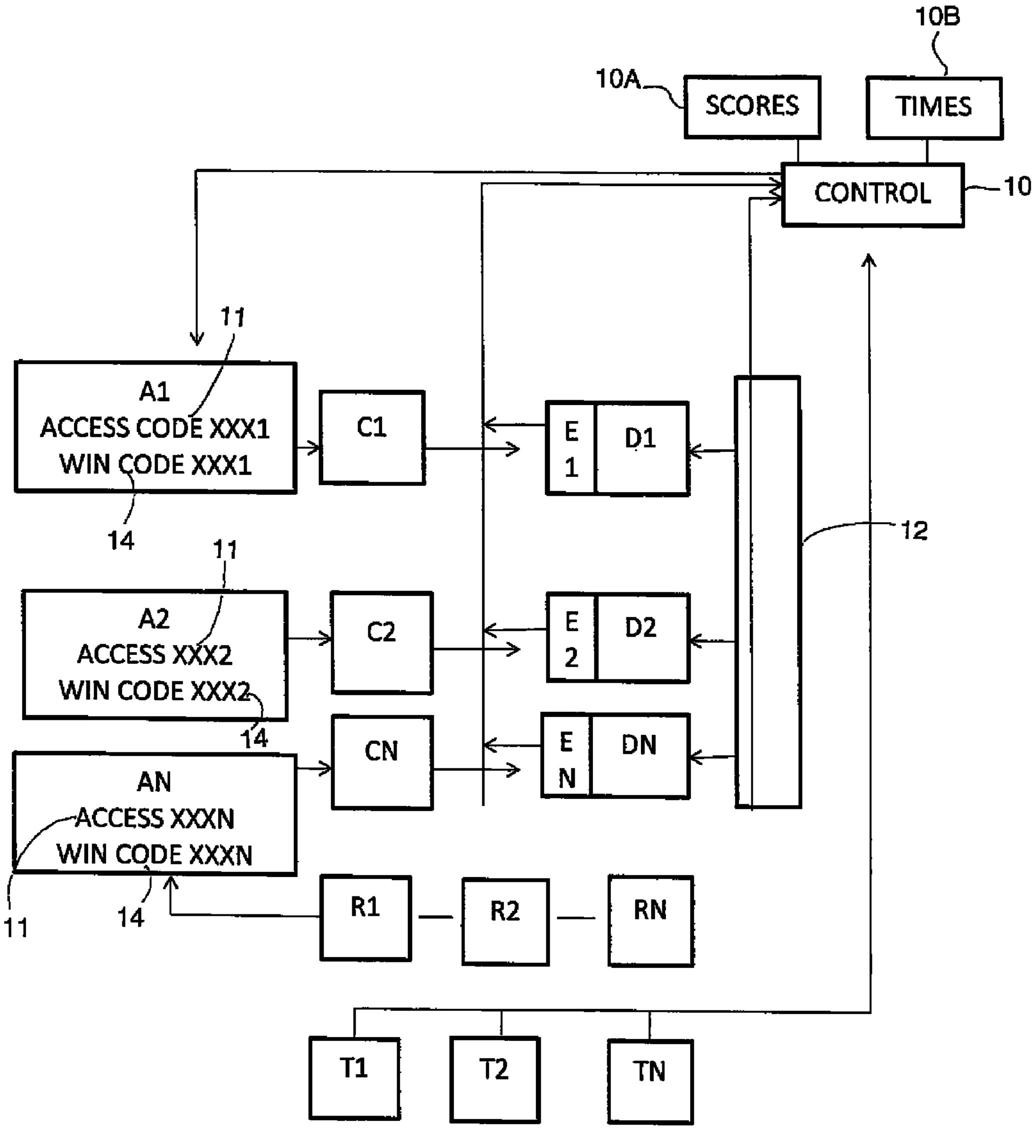
FIG. 1 is a schematic illustration of a method and apparatus of managing a lottery according to the present invention.
Figure 2:
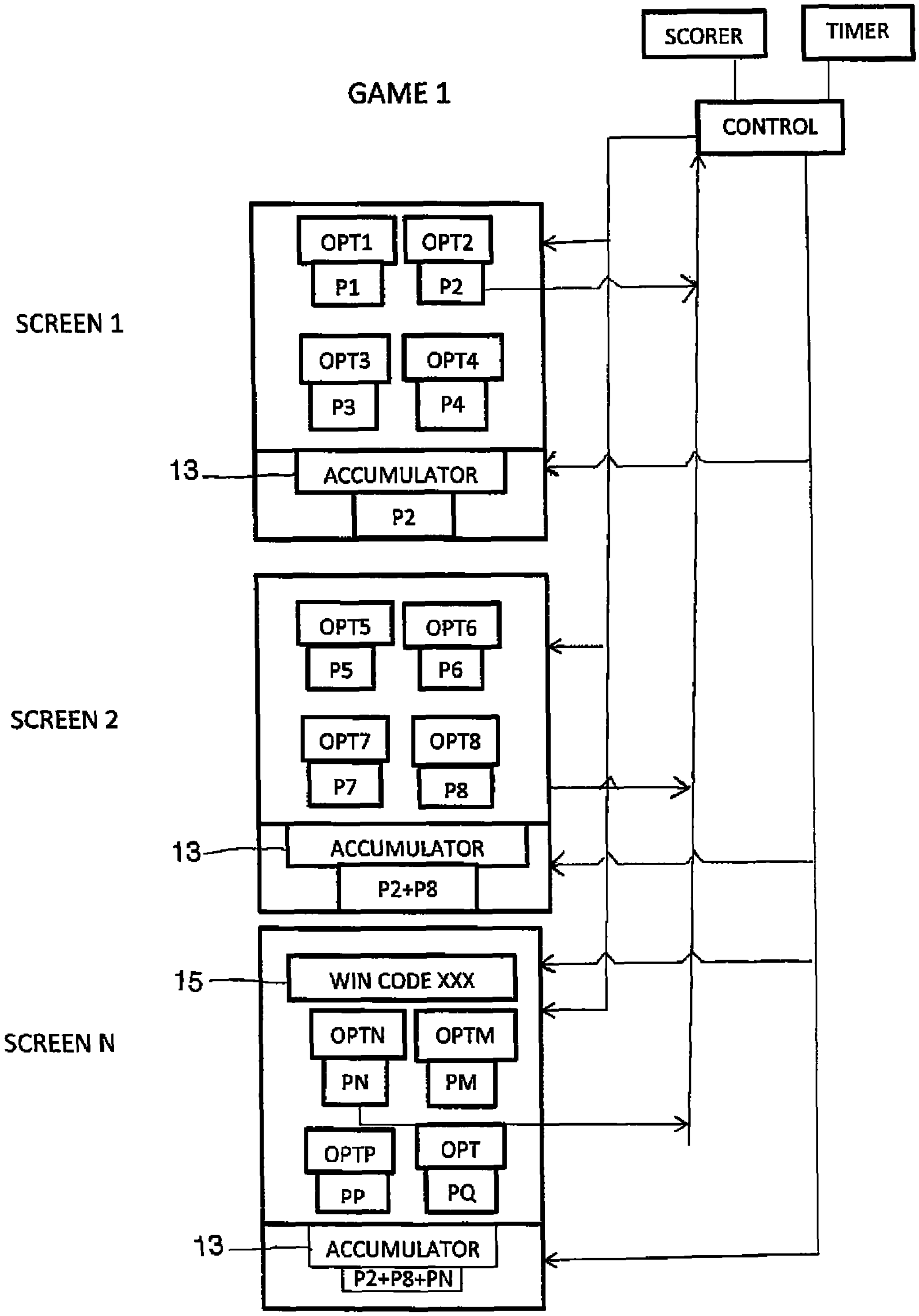
FIG. 2 is a schematic illustration of a series of screens generated by the control system in the apparatus of FIG. 1.

A method and apparatus for managing a lottery are shown in FIGS. 1 to 3 which includes a computer control system shown schematically at 10 which creates and prints a set of lottery access components or tickets A1, A2 to AN arranged to be purchased by customers requiring entry into the lottery through retailers R1 to RN. The computer control system 10 assigns as part of the creation step each of the lottery access components a predetermined win status having a prize value which is selected from a plurality of potential prizes including zero prize. These processes are well known of course to persons skilled in this art and procedures are well established to maintain security for the tickets themselves and for the allocated prizes to those tickets. It is well known that such a system securely provides to a lottery a set of tickets which can be sold to the public where the set of tickets has a predetermined total prize value. The tickets can then be sold to the customers indicated at C1 to CN who can access the data on the ticket to obtain information on its win status and can obtain the prize typically at the retailed using a terminal T1 to TN which uses data to validate the prize in conventional manner.

Each of the tickets may include additional conventional lottery games but also includes an access code 11 which the respective customer can use to access computer games provided on an associated website 12 operated by the control system 10. Access can be obtained using the code by any of the conventional systems available to a person skilled in the art. The access it provided to a specific game event stored for that access code.

In this arrangement, the control system 10 acts to generate through the web site on a terminal screen D1 to DN or other medium visible to the customers C1 to CN a series of accessible games where each game has display images shown in FIG. 2 as screens 1 to N which are visible to the customer on the terminals D1 to DN when accessed by the customer.

The generation and display of the game images is of course well known to persons skilled in the gaming technology so that the specific steps and arrangements which allow the pages to be displayed are not described herein and are not intended to be limited to any particular techniques, communication systems or computer systems.

Each game has a plurality of game steps indicated in FIG. 2 as Screen 1 to Screen N in which an image is displayed to the customer and in which the customer is required to enter a selected action responsive to the image displayed. Thus very simplistically, each image displayed (or at least some f the mages displayed) has a plurality of options available to the player indicated at OPT1 to OPTQ where those options are rendered complex as part of the game character so that the player must exercise skill and analysis to select one of the options to be played. Thee selection is entered on the terminal using entry E1 to EN of course of conventional nature.

In this arrangement, each of the game steps has an associated step prize P1 to PQ which is allocated to the player for selecting an associated action.

FIG. 2, shows that there are four options on each screen with different prizes associated with each option. The prizes will only be different if each option signifies a different skill level. In other words, if there are multiple options with the same skill, the prize with be the same. For example, in a typical game such as Candy Crush, if there are multiple options available to match three symbols, the prize will always be the same irrespective of the option they choose. However, if the player chooses a more skilled option and matches four symbols, they will get a different prize or multiple prizes. Therefore in one version of the game, there are only two options for prizes but many more options can be used in other games.

Typically the step prize is not apparent to the player so that the player selects the step based on skill or other factors and the control system allocates a step prize. This step prize is different from other step prizes on that screen so that they system can allocate a value of the step prize which is dependent on skill displayed. The player typically will be aware of the value of the step prize so that they can monitor their progress. In a simple system the step prize can be a single token for a simple selection and two or more tokens for a more complex or skilled selection. In the system shown all of the options have associated step prizes but this is not a requirement. In the system shown all of the screens have multiple options but this is not a requirement.

As shown on the screens 1 to N, part of the image displayed comprises an accumulation 13 of the step prizes so that after a selection is made, the screen shows the step prize awarded and the accumulation of those step prizes in the game as the game proceeds. Thus in screen 1 after option 2 is selected, the accumulator indicates that step prize P2 has been accumulated. Thus in screen N at the end of the game the accumulator indicates that step prizes P2, P8 and PN have been accumulated. This accumulation leads the system to generate a total prize for the game after all of the game steps are completed.

Of course the total prize may be zero so that the ticket concerned is not a winning ticket, that is the ticket is one of the many losers. However where a prize is won in the lottery, the player may redeem the ticket at a retailer R1 to RN where it is necessary for the prize to be validated to confirm making the payment to the customer of the prize value.

In order to effect the validation of the a payment to the customer of the it is necessary to enter into a validation terminal T1 to TN of the computer system a win code 14 from the lottery access component which is typically a code printed onto the ticket and a second validation code 15 supplied as one of the display images of the game and typically the final screen N. However this is not essential and there may be other forms of validation that are used depending on the customer's requirements. This could in some cases be as simple as a barcode under scratch-off which is printed on the ticket/coupon.

These codes are typically but not necessarily a series of alphanumeric elements both of which must be entered and both of which are required for the terminal T1 to TN to confirm the payment through the computer control system.

Figure 3B:
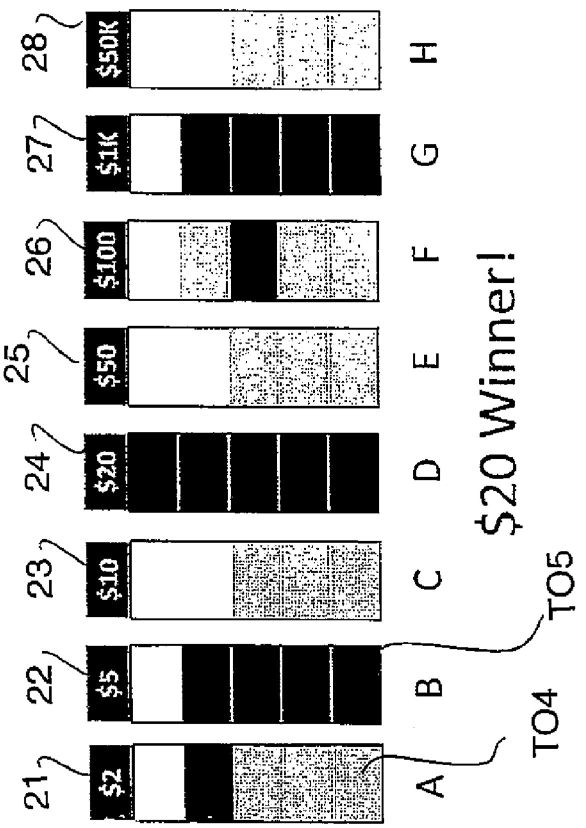
FIGS. 3A and 3B are each a schematic illustration of one example of an accumulator display on the screens of FIG. 2 of the apparatus of FIG. 1.
Figure 3A:
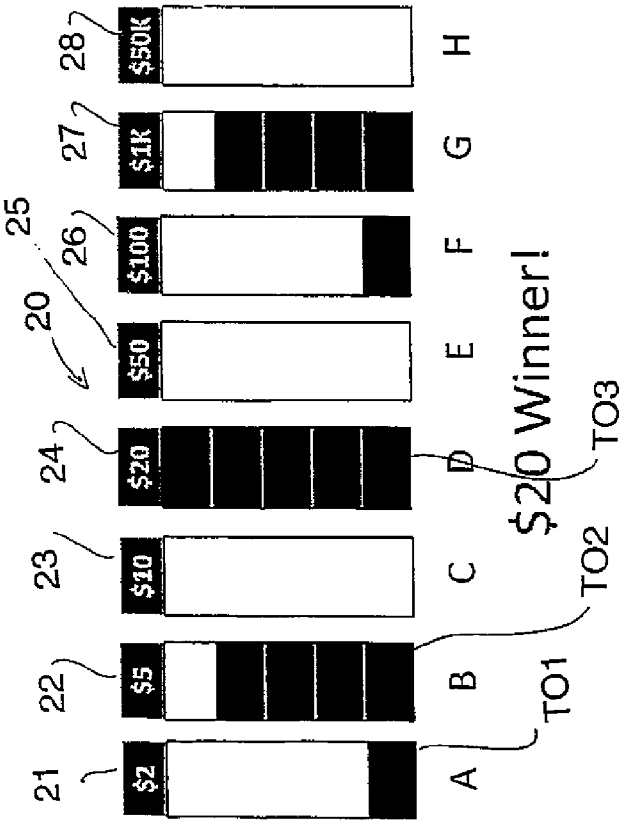

As shown in FIGS. 3A and 3B, the prize values each comprise a plurality of tokens TO1, TO2, TO3 etc. The term "token" is intended to mean in this embodiment an element of a unit value so that each token can be applied into the accumulator 20 as unit value and stacked with the other unit value tokens in a table. However as previously set out, this application does not require the use of unit value tokens and can instead use step prizes of different values.

Thus each of the prizes P1 to PQ has allocated a certain number of tokens where one option such as OPTION 1 to be selected has a step prize P1 of a first number of tokens typically one, and a second option to be selected such as OPTION 2 has a step prize of a different number of tokens typically two tokens.

In FIGS. 3A and 3B the accumulation system comprises a table 20 containing a series 21 to 28 of virtual pots or containers in the form of vertical columns. Each column is associated with respective prize of the lottery as shown from $2 up to $50,000.

The tokens TO1 etc are accumulated in the columns by the control system which controls the allocation, not by the player so that the player has no control over the allocation. Each column 21 to 28 is associated with a respective one of a plurality of potential prizes of the game, where a prize is awarded if the accumulated tokens fill a respective virtual pot associated with that prize. FIG. 3A 1.0 shows one extreme situation where the player is unskilled and receives only a single token for each step. FIG. 3B shows an opposed extreme situation where the player is very skilled and receives two tokens for each step. A practical situation is more likely where the player has a mixture of skilled moves and less skilled moves so that one token is provided for some steps and two or more for other steps. In any event the computer system 10 acts to allocate those tokens obtained and acts to control the allocation and therefore the accumulation of the step prizes or tokens of the accessed game in play in order that the total prize matches the prize value. That is it will be noted that total prize awarded by accumulating the step prizes as shown in FIG. 3A and in FIG. 3B is the same prize where the column or virtual pot 24 is filled with five tokens indicating a prize of $20. This is of course equal to the predetermined prize allocated to the ticket by the computer system 10 during the creation of the ticket set for the lottery. In FIG. 3B it will be noted that the player has accumulated twice as many tokens but the computer system has allocated those to different columns so that the only filled column is column 24. It will be noted also that the columns 25, 26, 27 and 28 which relate to the higher prizes are much closer to being filled in FIG. 3B than in FIG. 3A, giving the player the impression that their skill has given a closer possibility of winning the larger prize. This by itself represents and advantage that the skilled player obtains from the game even though the prize is the same and was predetermined from the outset. In this way, in the case that the player has selected an option which has allocated a step prize for selecting different options which is greater than another step prize, a secondary advantage is awarded to the customer different from the predetermined prize.

A further advantage is obtained by providing a memory component 10A of the control system 10 recording the total of step prizes or tokens obtained by customers so that customers can compare results either to their own previous attempts or to those of others of the lottery or of a group of customers of the lottery.

The player is also more heavily engaged with the outcome of the game by the fact of displaying to the customer the accumulation on the images shown in FIG. 2 as it occurs during the game.

A further advantage is obtained by providing a memory component 10B of the control system 10 recording a time taken by a customer to play the game for purposes of comparisons with other games so that customers can compare results either to their own previous attempts or to those of others of the lottery or of a group of customers of the lottery.

As the game results are predetermined and managed by the control system, the control system can generate different images so that the game can be played repeatedly for each game access component and can be different every time the game is replayed for the same component.

As the game results are predetermined and managed by the control system, the control system can generate images arranged such that each image is dependent on the action selected for the previous step.

The invention claimed is:

1. A method of determining, relative to a lottery event, a lottery pool payout to a player by a server comprising at least one processor, at least one communication link, and a data storage device comprising non-transitory machine-readable instructions that are executed on the at least one processor, comprising:

providing a set of lottery access components each of which is arranged to be purchased by a customer requiring entry into the lottery;

assigning by said at least one processor to each of the lottery access components a predetermined win status having a prize value which is selected from a plurality of potential prizes including zero prize;

the set therefore as determined by said at least one processor having a predetermined total prize value;

using said at least one processor to generate on a medium visible to the customers a series of accessible games;

each game having display images which are visible to the customer when accessed by the customer;

each game having a plurality of game steps in which an image is displayed to the customer and in which the customer is required to enter a selected action responsive to the image displayed;

wherein the game, which is accessed by a purchased one of the lottery access components, is completed by the customer entering the selected action for all of the game steps;

at least some of the game steps having an associated step prize which is allocated to the player for selecting an associated action;

at least one of the game steps having a plurality of options from which the customer can select the action, wherein the customer has allocated different step prizes for selecting different options;

providing an accumulation of the step prizes to generate a total prize for the game after all of the game steps are completed;

and controlling by said at least one processor, in the accessed game, the accumulation of the step prizes of the accessed game in order that the total prize matches the prize value;

and validating by said at least one processor a payment to the customer of the prize value.

2. The method according to claim 1 wherein said options are arranged to be selected based on a skill level of the customer so that a customer of more skill playing the same game gets more step prizes.

3. The method according to claim 2 including recording the step prizes obtained by customers so that customers can compare results.

4. The method according to claim 1 including displaying to the customer the accumulation as it occurs during the game.

5. The method according to claim 4 wherein the accumulation is provided on the display with game images.

6. The method according to claim 1 wherein the prize values comprise a plurality of tokens where one or more tokens are granted for at least some of the actions and wherein said accumulation comprises a series of virtual pots or containers where the tokens are accumulated.

7. The method according to claim 6 wherein the virtual pots or containers are each associated with a respective one of a plurality of the potential prizes and wherein a prize is awarded if the accumulated tokens fill a respective virtual pot or container associated with that prize.

8. The method according to claim 7 wherein the virtual pots or containers are displayed in a form of a table where the amount contained in a respective virtual pot or container is shown as a row of elements.

9. The method according to claim 6 wherein one option to be selected has a first number of tokens and a second option to be selected has a different number of tokens.

10. The method according to claim 1 including recording a total of the accumulated prize values obtained by a customer for purposes of comparisons with other games.

11. The method according to claim 1 including recording a time taken by a customer to play the game for purposes of comparisons with other games.

12. The method according to claim 1 wherein game can be played repeatedly for each game access component and is different every time the game is replayed for the same component.

13. The method according to claim 1 wherein the game is arranged such that the images of the steps displayed are arranged such that each is dependent on the action selected for the previous step.

14. The method according to claim 1 wherein the lottery access component comprises a ticket having an access code printed thereon.

15. The method according to claim 1 wherein payment validation requires entry of a code from the lottery access component and a code supplied as one of the images of the game.

16. The method according to claim 1 wherein, in the case that the customer has selected an option which has allocated a step prize for selecting different options which is greater than another step prize, a secondary advantage is awarded to the customer different from said predetermined prize.

17. A method of determining, relative to a lottery event, a predetermined prize payout to a player by a server comprising at least one processor at least one communication link, and a data storage device comprising non-transitory machine-readable instructions that are executed on the at least one processor, comprising:

using said at least one processor to generate a game having display images on a medium visible to a customer;

the game having a plurality of game steps in which an image is displayed to the customer and in which the customer is required to enter a selected action responsive to the image displayed;

wherein the game is completed by the customer entering the selected action for all of the game steps;

at least some of the game steps having an associated step prize which is allocated to the player for selecting an associated action;

at least one of the game steps having a plurality of options from which the customer can select the action, wherein the customer has allocated different step prizes for selecting different options;

providing an accumulation of the step prizes to generate a total prize for the game after all of the game steps are completed;

and controlling by said at least one processor the accumulation of the step prizes of the accessed game in order that the total prize matches said predetermined prize value.

18. The method according to claim 17 wherein the prize values each comprise a plurality of tokens where one option to be selected has a first number of tokens and a second option to be selected has a different number of tokens, wherein said accumulation comprises a table containing a series of virtual pots or containers where the tokens are accumulated and each virtual pot or container is associated with a respective one of a plurality of potential prizes of the game, wherein a prize is awarded if the accumulated tokens fill a respective virtual pot associated with that prize and wherein the computer based system controls the allocation of the accumulated tokens to selected ones of the series of virtual pots.

19. A method of determining, relative to a lottery event, a lottery pool payout to a player by a server comprising at least one processor at least one communication link, and a data storage device comprising non-transitory machine-readable instructions that are executed on the at least one processor, comprising:

providing a set of lottery access components each of which is arranged to be purchased by a customer requiring entry into the lottery;

assigning by said at least one processor to each of the lottery access components a predetermined win status having a prize value which is selected from a plurality of potential prizes including zero prize;

using said at least one processor to generate on a medium visible to the customers a series of accessible games;

each game having display images which are visible to the customer when accessed by the customer;

wherein the game, which is accessed by a purchased one of the lottery access components, is completed by the customer entering one or more selected actions based on the display images;

and validating by said at least one processor a payment to the customer of the prize value by entering into a validation terminal of said at least one processor a code from the lottery access component and a code supplied as one of the displayed images of the game.

* * * * *